(12) United States Patent
Kim (10) Patent No.: US 8,416,378 B2
(45) Date of Patent: Apr. 9, 2013

(54) LIQUID CRYSTAL DISPLAY DEVICE

(75) Inventor: Do-Sung Kim, Gumi (KR)

(73) Assignee: LG Display Co., Ltd., Seoul (KR)

( * ) Notice: Subject to any disclaimer, the term of this patent is extended or adjusted under 35 U.S.C. 154(b) by 1354 days.

(21) Appl. No.: 11/967,647

(22) Filed: Dec. 31, 2007

(65) Prior Publication Data

US 2008/0259238 A1 Oct. 23, 2008

(30) Foreign Application Priority Data

Apr. 19, 2007 (KR) .................. 10-2007-0038511

(51) Int. Cl.
*G02F 1/1335* (2006.01)
*G02F 1/136* (2006.01)
*G02F 1/1343* (2006.01)

(52) U.S. Cl. ............ 349/119; 349/48; 349/96; 349/113; 349/117; 349/141; 349/143

(58) Field of Classification Search ............... 349/48, 349/61, 96, 113, 117, 119, 141, 143
See application file for complete search history.

(56) References Cited

U.S. PATENT DOCUMENTS

| 7,420,635 B2 * | 9/2008 | Ozawa ................ 349/114 |
| 2004/0027513 A1 * | 2/2004 | Yuuki et al. .......... 349/96 |
| 2004/0070711 A1 | 4/2004 | Wen et al. |
| 2006/0038946 A1 * | 2/2006 | Yoshida et al. ....... 349/114 |

FOREIGN PATENT DOCUMENTS

| CN | 1656420 A | 8/2005 |
| TW | 573170 B | 1/2004 |
| TW | 200636345 | 10/2006 |

OTHER PUBLICATIONS

Office Action issued in corresponding Taiwan Patent Application No. 096151644, mailed Sep. 9, 2011.
Office Action issued in corresponding Chinese Patent Application No. 2007103083364; issued Aug. 7, 2009.

* cited by examiner

*Primary Examiner* — Uyen Chau N Le
*Assistant Examiner* — Michael Mooney
(74) *Attorney, Agent, or Firm* — Brinks Hofer Gilson & Lione (57) ABSTRACT

An LCD device comprises a liquid crystal display panel. The liquid crystal display panel comprises a first substrate that has a plurality of pixels divided into a reflective portion and a transmissive portion therein, respectively. The liquid crystal display panel further comprises a second substrate that faces the first substrate, and a liquid crystal layer between the first substrate and the second substrate. Light introduced into the reflective portion of the first substrate through the second substrate is reflected to the second substrate from the reflective portion, and light introduced into the transmissive portion of the first substrate transmits the first substrate.

25 Claims, 10 Drawing Sheets

FIG. 5A rubbing direction

FIG. 5B rubbing direction

LIQUID CRYSTAL DISPLAY DEVICE

CLAIM FOR PRIORITY

The present invention claims priority to Korean Patent Application No. 10-2007-0038511, filed Apr. 19, 2007, the entirety of which is hereby incorporated by reference.

FIELD

The present invention relates to an LCD (Liquid Crystal Display) device, and more particularly, to an LCD device which is capable of simultaneously implementing screens on a front surface and a rear surface different from each other.

BACKGROUND

Generally, LCD devices are apparatus for displaying images by controlling aligned status of liquid crystal having a dielectric anisotropy by using an electric field generated by a potential difference between electrodes facing to each other, and then adjusting transmittance of light according to the aligned status of the liquid crystal.

The LCD device is generally equipped with a liquid crystal display panel and a backlight unit disposed at a rear side of the liquid crystal display panel. And, light generated from the backlight unit is made to be incident on the liquid crystal display panel, so that images are displayed on a front surface of the liquid crystal display panel. Accordingly, the related liquid crystal display panel is configured to display images only on the front surface thereof.

Figure 1A:
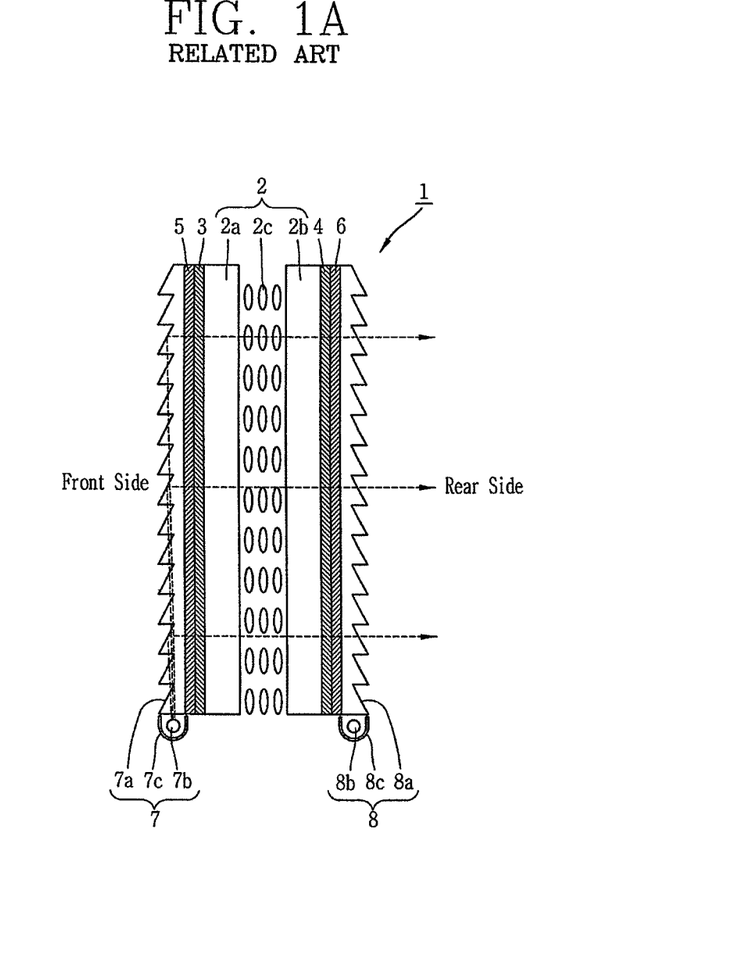
FIGS. 1a and 1b are diagrams for explaining a structure and an operating principle of the related LCD device.
Figure 1B:
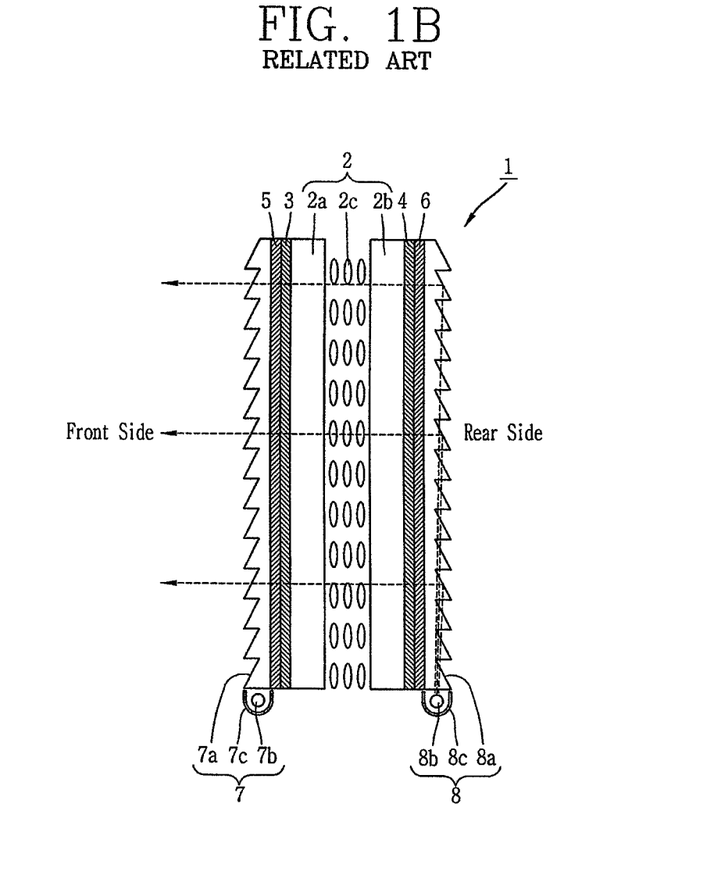

However, recently, as LCD devices has been widely used, a dual liquid crystal display device that can implement images on both the front and the rear surfaces of the liquid crystal display device using one liquid crystal display panel is proposed so as to view the liquid crystal display device at various angles The dual liquid crystal device 1, as shown in FIGS. 1a and 1b, includes a liquid crystal display panel 2, a front polarizer 3 attached at a front surface portion of the liquid crystal display panel 2, a rear polarizer 4 attached at a rear surface portion of the liquid crystal display panel 2, a front backlight unit 7 disposed at the front surface portion of the liquid crystal panel 2, and a rear backlight unit 8 disposed at the rear surface portion of the liquid crystal panel 2. And, the dual liquid crystal device 1 further includes a front micro reflective film 5 interposed between the front polarizer 3 and the front backlight unit 7, and a rear micro reflective film 6 interposed between the rear polarizer 4 and the rear backlight unit 8.

Here, the liquid crystal display panel 2 includes a thin film transistor substrate 2a provided with thin film transistors (not shown) thereon, a color filter substrate 2b facing the thin film transistor substrate 2a and provided with a color filter layer (not shown), and a liquid crystal layer 2c interposed between both substrates 2a and 2b.

The front polarizer 3 and the rear polarizer 4 transmit light vibrating only in one direction so as to polarize natural light, and each polarizing axis thereof is disposed in a direction perpendicular to each other.

The front micro reflective film 5, when the light generated from the front backlight unit 7 transmits the liquid crystal display panel 2 and then images are implemented on the rear surface thereof, serves to reflect external light irradiated to the rear surface. The rear micro reflective film 6, when the light generated from the rear backlight unit 8 transmits the liquid crystal display panel 2 and then images are implemented at the front side thereof, serves to reflect the external light irradiated to the front side. Accordingly, a problem that it is difficult to view a screen of the LCD device 1 where the bright external light is introduced thereinto can be solved. That is, when the light from the front or rear backlight unit 7, 8 is less bright than the external light, the images on the liquid crystal display device 1 may not be viewed. Here, reflecting the external light by using the front micro reflective film 5 and the rear micro reflective film 6, light efficiency can be enhanced, thereby rendering the liquid crystal display device 1 capable of viewing the images clearly.

The front backlight unit 7 and the rear backlight unit 8 include optical guide plates 7a, 8a, light sources 7b, 8b disposed at each one lateral surface of the optical guide plates 7a, 8a, and light source reflectors 7c, 8c encompassing some of circumferences of the light sources 7b, 8b, respectively.

Meanwhile, though it is not shown, a compensation plate for compensating a phase of light, a diffusion film for diffusing the light, etc. may be further included.

With such a configuration, when the front backlight unit 7 is turned on, as shown in FIG. 1a, the images are implemented on the rear surface. When the rear backlight unit 8 is turned on, as shown in FIG. 1b, the images are implemented on the front surface.

However, such a dual LCD device 1 has problems in that the images cannot be simultaneously displayed on the front and rear surfaces, but can selectively displayed on the front or rear surface. Additionally, images cannot be simultaneously displayed on the front surface and the rear surface differently from each other.

SUMMARY

In one aspect, an LCD device comprises a liquid crystal display panel. The liquid crystal display panel comprises a first substrate that has a plurality of pixels divided into a reflective portion and a transmissive portion therein, respectively. The liquid crystal display panel further comprises a second substrate that faces the first substrate, and a liquid crystal layer between the first substrate and the second substrate. Light introduced into the reflective portion of the first substrate through the second substrate is reflected to the second substrate from the reflective portion, and light introduced into the transmissive portion of the first substrate transmits the first substrate.

In another aspect, an LCD device comprises a liquid crystal display panel. The liquid crystal display panel comprises a first substrate that has a plurality of pixels divided into a reflective portion and a transmissive portion therein, respectively, a second substrate that faces the first substrate, and a liquid crystal layer between the first substrate and the second substrate. The LCD device further comprises an optical guide plate disposed to be adjacent to an exterior surface of the second substrate, and at least one light source unit disposed at least one lateral surface of the optical guide plate. Light from the light source unit is irradiated to the second substrate by the optical guide plate. The light introduced into the reflective portion of the first substrate through the second substrate is reflected to the second substrate from the reflective portion, and the light introduced into the transmissive portion of the first substrate transmits the first substrate.

In yet another aspect, an LCD device comprises a liquid crystal display panel. The liquid crystal display panel comprises a first substrate that has a plurality of pixels divided into a reflective portion and a transmissive portion therein, respectively, a second substrate that faces the first substrate, and a liquid crystal layer between the first substrate and the second substrate. The LCD device further comprises a first polarizer disposed at an exterior surface of the first substrate, and a second polarizer disposed at an exterior surface of the second substrate. A long axis of each liquid crystal molecules of the liquid crystal layer in the reflective portion is inclined by about 22.5 degrees with respect to a polarizing axis of the second polarizer when an electric field is generated between the first pixel electrode and the first common electrode, while aligned in parallel with the polarizing axis of the second polarizer when the electric field is not generated.

BRIEF DESCRIPTION OF THE DRAWINGS

The accompanying drawings, which are included to provide a further understanding of the invention and are incorporated in and constitute a part of this specification, illustrate preferred embodiments of the invention and together with the description serve to explain the principles of the invention. In the drawings.

DETAILED DESCRIPTION

Description will now be given in detail of the preferred embodiments of the present invention, examples of which are illustrated in the accompanying drawings.

Figure 2:
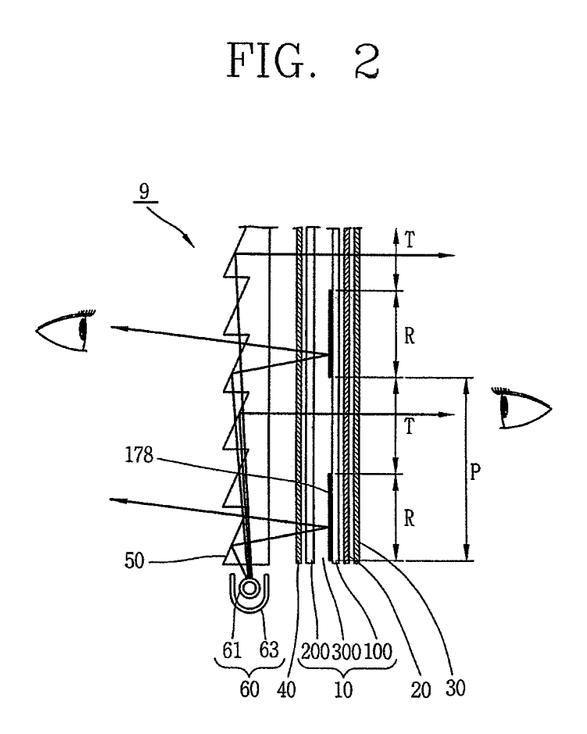
FIG. 2 schematically illustrates a structure of an LCD in accordance with one embodiment of the present disclosure.

Referring to FIG. 2, an LCD device 9 is implemented as a dual LCD device which is capable of simultaneously implementing different screens or the same screen both on a front surface and on a rear surface. Referring to FIG. 2, an LCD device 9 is implemented as a dual LCD device which is capable of simultaneously implementing different screens or the same screen both on a front surface and on a rear surface.

The LCD device 9, as shown in FIG. 2, includes a liquid crystal display panel 10, a first polarizer 30 and a second polarizer 40 respectively attached at the front side and the rear side of the liquid crystal display panel 10, a quarterwave plate 20 interposed between the liquid crystal display panel 10 and the first polarizer 30, and an optical guide plate 50 disposed at a rear side of the second polarizer 40 and at least one light source unit 60 disposed at one lateral side of the optical guide plate 50.

First, referring to FIGS. 3 and 4, the liquid crystal display panel 10 will be described.

Figure 4:
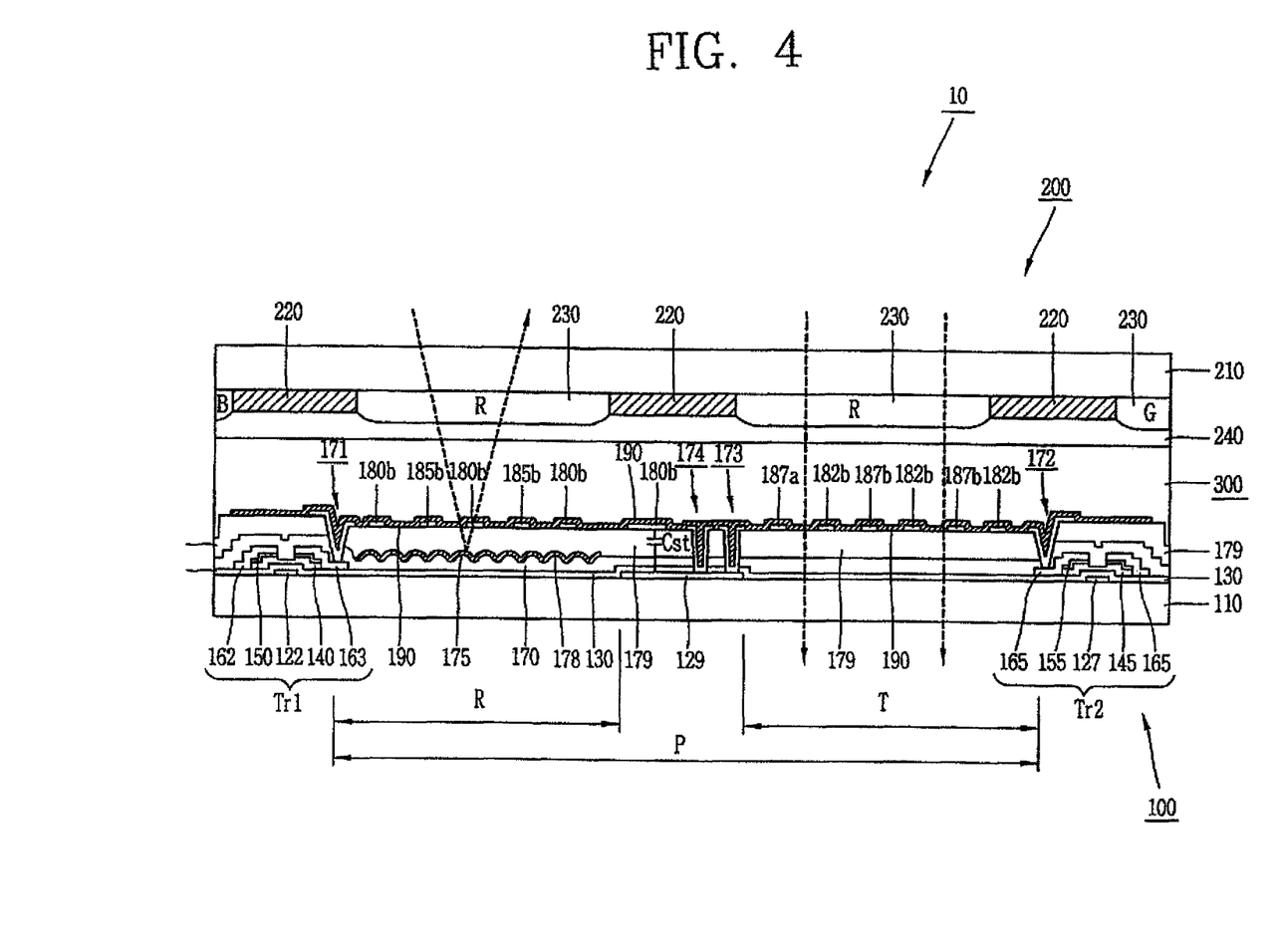
FIG. 4 is a sectional view taken along line IV-IV.

The liquid crystal display panel 10, as shown in FIG. 4, includes a first substrate 100 including a plurality of pixels (P) divided into a reflective portion (R) and a transmissive portion (T), a second substrate 200 disposed to face the first substrate 100, and a liquid crystal layer 300 interposed between the first substrate 100 and the second substrate 200. Here, the first substrate 100 is implemented as a thin film transistor substrate provided with thin film transistors (TFT), and the second substrate 200 is implemented as a color filter substrate 200 on which a color filter layer is formed.

Figure 3:
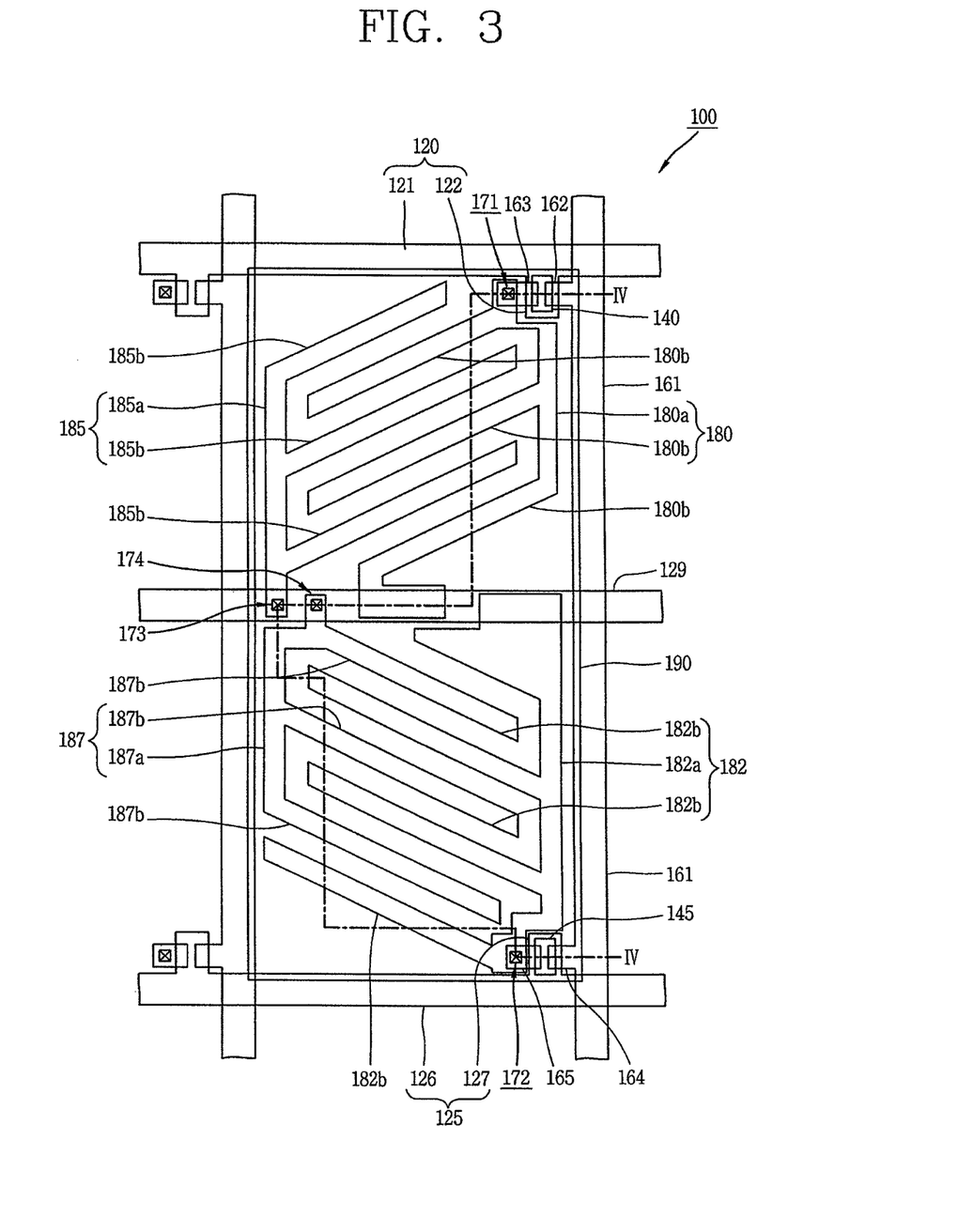
FIG. 3 is a diagram illustrating an arrangement of a thin film transistor substrate in accordance with one embodiment of the present disclosure.

The first substrate 100, as shown in FIGS. 3 and 4, includes a first gate line 120 and a second gate line 125 in parallel with each other on a first insulted substrate 110. The first gate line 120 and the second gate line 125 respectively include a first gate line 121 and a second gate line 126 extended on the first insulated substrate 110 in a horizontal direction, a first gate electrode 122 and a second gate electrode 127 diverged from the first gate line 121 and the second gate line 126, and first and second gate pads (not shown) disposed at end portions of the first gate line 121 and the second gate line 126 and connected to a gate operating portion (not shown) so as to receive operating signals.

A common voltage line 129 is formed on the same layer with the first gate line 120 and the second gate line 125. The common voltage line 129 is interposed between the first gate line 121 and the second gate line 125 and extended therefrom in parallel therewith. That is, the common voltage line 129 is disposed at a boundary area between the reflective portion (R) and the transmissive portion (T). The common voltage line 129 forms a storage capacitance (Cst) by being overlapped with the following first pixel electrode 180 and second pixel electrode 182. And, a constant common voltage (Vcom) is applied to the common voltage line 129. The common voltage line 129 is formed of the same material as the first gate line 120 and the second gate line 125.

A gate insulating film 130 formed of $SiN_x$, $SiO_2$, etc. covers the first gate line 120, the second gate line 125 and the common voltage line 129 on the first insulated substrate 110. And, a hole is formed at the gate insulating film 130 so that a portion of the common voltage line 129 is exposed.

A first semiconductor layer 140 and a second semiconductor layer 145 are formed at upper portions of the gate insulating film 130 of the first gate electrode 122 and the second gate electrode 127, respectively. The first semiconductor layer 140 and the second semiconductor layer 145 may be formed of a semiconductor such as amorphous silicon, crystalloid silicon, or the like. A first resistant contact layer 150 and a second resistant contact layer 155 formed of a material such as silicide, an n+ hydrogenated amorphous silicon in which n type impurities are doped with a high concentration or the like are formed at upper portions of the first semiconductor layer 140 and the second semiconductor layer 145, respectively. The first resistant contact layer 150 and the second resistant contact layer 155 are removed at channel portions between a first source electrode 162 and a first drain electrode 163 and between a second source electrode 164 and a second drain electrode 165.

Data lines 161, 162, 163, 164, 165 are formed at the upper portions of the first resistant contact layer 150, the second resistant contact layer 155 and the gate insulating film 130 that is not covered by the first and second resistant contact layers 150, 155. The data lines include a data line 161 formed in a vertical direction, the first and second source electrodes 162, 164 diverged from the data line 161 and extended to the upper portions of the first and second resistant contact layers 150, 155, the first and second drain electrodes 163, 165 separated from the first and second source electrodes 162, 164 and formed at the upper portions of the first and second resistant contact layers 150, 155 opposite to the first and second source electrodes 162, 164, and a data pad (not shown) disposed at an end portion of the data line 161 and connected to the data operating portion (not shown) so as to receive image signals. Here, the data line 161 is crossed with the first gate line 121 and the second gate line 126 to define the plurality of pixels (P). And, the plurality of pixels (P) are divided into the reflective portion (R) reflecting light from the light source unit 60 (as shown in FIG. 2) and the transmissive portion (T) transmitting the light from the light source unit 60.

Here, the first gate electrode 121, the first semiconductor layer 140, the first resistant contact layer 150, the first source electrode 162 and the first drain electrode 163 form a first thin film transistor (Tr1). That is, the first thin film transistor (Tr1) is disposed at intersections between the first gate line 120 and the data lines (161, 162, 163) so that the reflective portion (R) of the pixel (P) is operated.

And, the second gate electrode 127, the second semiconductor layer 145, the second resistant contact layer 155, the second source electrode 164 and the second drain electrode 165 form a second thin film transistor (Tr2). That is, the second thin film transistor (Tr2) is disposed at intersections between the second gate line 125 and the data lines (161, 164, 165) so that the reflective portion (T) of the pixel (P) is operated.

A diffusion layer 170 is formed at the upper portions of the data lines 161, 162, 163, 164, 165 and the gate insulating film 130 which is not covered therewith. That is, the diffusion layer 170 is formed at the front side of the first insulated substrate 110 so as to cover the first thin film transistor (Tr1) and the second thin film transistor (Tr2). And, a concave-convex portion 175 is formed at an area corresponding to the reflective portion (R) on the diffusion layer 170. The concave-convex portion 175 formed on the surface of the diffusion layer 170 causes diffusing of light so that a reflexibility, i.e., a front reflexibility of the light can be enhanced. The concave-convex portion 175, as shown in FIG. 4, is formed in an embossing shape having a round cross section. Further, drain contact openings 171, 172 exposing the first drain electrode 163 and the second drain electrode 165 are formed on the diffusion layer 170, respectively. Further, common voltage contact openings 173, 174 partially exposing the common voltage line 129 are formed on the diffusion layer 170.

A reflector 178 is formed at the upper portion of the diffusion layer 170 having the concave-convex portion 175 thereon. Here, the pixel (P) formed by the first gate line 121, the second gate line 126 and the data line 161 is divided into the transmissive portion (T) not having the reflector 178 thereon and the reflective portion (R) having the reflector 178 thereon. In the transmissive portion (T) not having the reflector 178 thereon, the light from the light source unit 60 is irradiated to the front surface of the liquid crystal display panel 10, and in the reflective portion (R) having the reflector (178) thereon, the light from the light source unit 60 is reflected from the reflector 178 and then irradiated to the rear surface of the liquid crystal panel 10. Particularly, the light introduced into the reflective portion (R) from the light source unit 60 is reflected from the reflector 178 formed at the reflective portion (R) and then irradiated to the second substrate 200, the light introduced into the transmissive portion (T) from the light source unit 60 is irradiated to the first substrate 100. The reflector 178 is usually formed of aluminium or silver, however a double layer of aluminium/molybdenum may be used. And, the concave-convex portion is also formed on the reflector 178 by the concave-convex portion 175 on the diffusion layer 170.

The diffusion layer 170 and the reflector 178 are covered with a protective film 179. Similar to the diffusion layer 170, the drain contact openings 171, 172 respectively exposing the first drain electrode 163 and the second drain electrode 165 are formed at the protective film 179. Also, similar to the diffusion layer 170, the common voltage contact openings 173, 174 partially exposing the common voltage line 129 are formed at the protective film 179. The protective film 179 is formed of an inorganic material such as $SiN_x$, $SiO_2$. The protective film 179 however may be formed of an organic material such as acryl-based polymers.

The first and second pixel electrodes 180, 182, and the first and second common electrodes 185, 187 are formed on the protective film 179. The first and second pixel electrodes 180, 182, and the first and second common electrode 185, 187 are usually formed of a transparent conductive material such as ITO (indium tin oxide), IZO (indium zinc oxide) or the like.

The first pixel electrode 180 is electrically connected to the first drain electrode 163 through the drain contact opening 171, and the second pixel electrode 182 is electrically connected to the second drain electrode 165 through the drain contact opening 172. The first pixel electrode 180 and the second pixel electrode 182 are physically separated from each other. And, the first pixel electrode 180 is formed at the reflective portion (R) and the second pixel electrode 182 is formed at the transmissive portion (T). The first pixel electrode 180 includes a first area 180a extended along the data line 161 and a plurality of second areas 180b diverged from the first area 180a. The plurality of second areas 180b are parallel with each other and inclined by a constant angle with respect to the first area 180a. And, some of the second areas 180b are extended to be overlapped with the common voltage line 129 so as to form the storage capacitance (Cst). The second pixel electrode 182 is configured to be similar with the first pixel electrode 180. That is, the second pixel electrode 182 includes a first area 182a that is parallel with the data line 161, and a plurality of second areas 182b diverged from the first area 182a. The second pixel electrode 182 is extended to overlap the first area 182a and the common voltage line 129 with each other. That is, the common capacitance (Cst) is formed between the first area 182a of the second pixel electrode 182 and the common voltage line 129.

Meanwhile, the second areas 180b of the first pixel electrode 180 are inclined by angles different from the second areas 182b of the second pixel electrode 182. The reason that the second areas 180b of the first pixel electrode 180 and the second areas 182b of the second pixel electrode 182 are configured to be inclined by different angles from each other is that optical characteristics of the reflective portion (R) and the transmissive portion (T) are different from each other. This will be described in detail where an operating principle of the LCD device 9 is described.

The first common electrode 185 is electrically connected to the common voltage line 129 through the common voltage contact opening 173, and the second common electrode 187 is electrically connected to the common voltage line 129 through the common voltage contact opening 174. The first common electrode 185 and the second common electrode 187 are physically separated from each other. And, the first common electrode 185 is formed at the reflective portion (R) and the second common electrode 187 is formed at the transmissive portion (T). The first common electrode 185 includes a first area 185a extended along the data line 161, and a plurality of second areas 185b diverged from the first area 185a. The second areas 185b are inclined by a constant angle with respect to the first area 185a. The second common electrode 187 is configured to be similar with the first common electrode 185. That is, the second common electrode 187 includes the first area 187a that is parallel with the data line 161, and a plurality of second areas 187b diverged from the first area 187a. The second areas 185a of the first common electrode 185 are inclined by angles different from the second areas 187b of the second common electrode 187.

And, the second areas 185b of the first common electrode 185 are alternately parallel with the second areas 180b of the first pixel electrode 180, and the second areas 187*b* of the second common electrode 187 are alternately parallel with the second areas 182*b* of the second pixel electrode 182.

Meanwhile, configurations of the first pixel electrode 180, the second pixel electrode 182, the first common electrode 185 and the second electrode 187 are not limited to the above-mentioned, but may be variously modified.

Each pixel (P) is provided with a quarterwave layer 190. The quarterwave layer 190 is formed on the protective film 179 so as to cover the first pixel electrode 180, the second pixel electrode 182, the first common electrode 185 and the second common electrode 187. The quarterwave layer 190 represents a layer having a $\lambda/4$ (90 degrees) of retardation value. When a slow axis of the quarterwave layer 190 is disposed to be inclined by an angle of 45° with respect to an optical axis of the light (vibration direction of light), the light (linearly polarized light) passed through the quarterwave layer 190 is converted into a circularly polarized light (left-hand polarized light or right-hand polarized light). The quarterwave layer 190 may include a photosensitive polymer RM (reactive mesogen). The quarterwave layer 190, however may include various materials.

The first substrate 100 and the second substrate 200 are attached to each other by interposing the liquid crystal layer 300 therebetween. The second substrate 200, as shown in FIG. 4, includes a black matrix 220 formed on a second insulated substrate 210. The black matrix 220, as shown in FIG. 4, is formed in a matrix shape allowing to cover the first and second gate lines 120, 125 (referring to FIG. 3), the common voltage line 129 (referring to FIG. 3), and the first and second thin film transistors (Tr1, Tr2) formed on the first substrate 100. The black matrix 220 generally serves to distinguish the red, green and blue color filters from each other, and to block the light directly irradiated to the first and second thin film transistors (Tr1, Tr2). Also, the black matrix 220 serves to prevent the light from being shone through the pixels (P) adjacent thereto. The black matrix 220 is generally formed of a photosensitive organic material into which a black-colored pigment is added. A carbon black, a titanium oxide or the like may be used as the black-colored pigment.

In color filter layers 230, red, green and blue color filters are alternately formed by interposing the black matrix 220 therebetween. The color filter layers 230 serve to provide the light passed through the liquid crystal layer 300 after being irradiated from the light source unit 60 with colors. The color filter layers 230 are generally formed of the photosensitive organic material.

An overcoat film 240 is formed at upper portions of the color filter layers 230 and the black matrices 220 not covered with the color filter layers 230. The overcoat film 240 serves to flatten and protect the color filter layers 230, and is generally formed of an acryl-based epoxy material.

The liquid crystal layer 300 is interposed between the first substrate 100 and the second substrate 200. The liquid crystal layer 300 is formed of a plurality of liquid crystal molecules 310 (referring to FIG. 5*a*), and may be in an IPS (in-plane switching) mode. However, the liquid crystal layer 300 may be implemented by various types of liquid crystals. Here, the liquid crystal layer 300 has a cell gap adjusted to have a $\lambda/2$ of retardation value.

Then, with reference to FIG. 2, configurations except the liquid crystal display panel will be described.

The quarterwave plate 20 is attached at the front side of the liquid crystal panel 10. The quarterwave plate 20 performs a function substantially same as the quarterwave layer 190 except that the quarterwave plate 20 is attached at the front side of the liquid crystal panel 10 by being formed in a plate shape. The slow axis of the quarterwave plate 20 is perpendicular with that of the quaterwave layer 190.

And, the first polarizer 30 is attached at one side of the quarterwave plate 20, and the second polarizer 40 is attached at the rear side of the liquid crystal display panel 10. Each slow axis of the first polarizer 30 and the second polarizer 40 are crossed with each other.

The optical guide plate 50 is disposed at the rear side of the second polarizer 40. The optical guide plate 50 guides the light generated from the light source unit 60 toward the rear side of the liquid crystal display panel 10. Particularly, the optical guide plate 50 includes an incidence surface on which the light is made to be incident from the light source unit 60, an exit surface extended from the incidence surface and facing the liquid crystal display panel 10, and a rear surface on which a pattern is formed so as for the light irradiated from the light source unit 60 to the incidence surface to proceed to the exit surface. Accordingly, the optical guide plate 50 converts the light irradiated from the light source unit 60 adjacent to the incidence surface to the incidence surface into a plane light and then uniformly distributes the plane light onto the liquid crystal panel 10 through the exit surface. Preferably, the optical guide plate 50 is formed of a material that has high intensity, small deformation, light weight and high optical transmittance. For example, the optical guide plate 50 may be fabricated with a transparent acryl resin.

At least one light source unit 60 is disposed at one lateral surface (incidence surface) of the optical guide plate 50. The light source unit 60 includes a lamp 61 and a lamp reflector 63 encompassing part of the circumference of the lamp 61. The light of the lamp 61 is reflected from the lamp reflector 63 and then irradiated to the incidence surface of the optical guide plate 50. Here, the lamp 61 is implemented as a CCFL (Cold Cathode Fluorescent Lamp). The lamp 61 however may be implemented as an EEFL (External Electrode Fluorescent Lamp) that has high brightness, low cost and power consumption characteristics and is capable of operating the lamp 61 with only one inverter (not shown). And, an LED that has excellent brightness and color reproducibility may be used.

Hereafter, the operating principle of the liquid crystal molecule will be described with reference to FIGS. 5*a* and 5*b*.

Figure 5A:
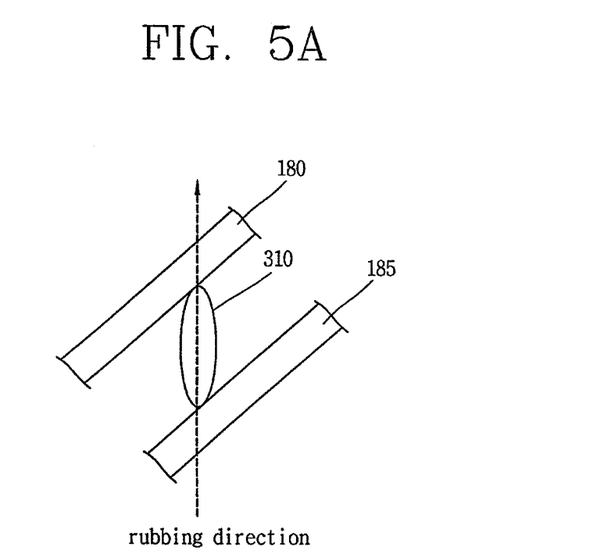
FIGS. 5a and 5b are diagrams for explaining an operation of a liquid crystal molecule at a pixel.
Figure 5B:
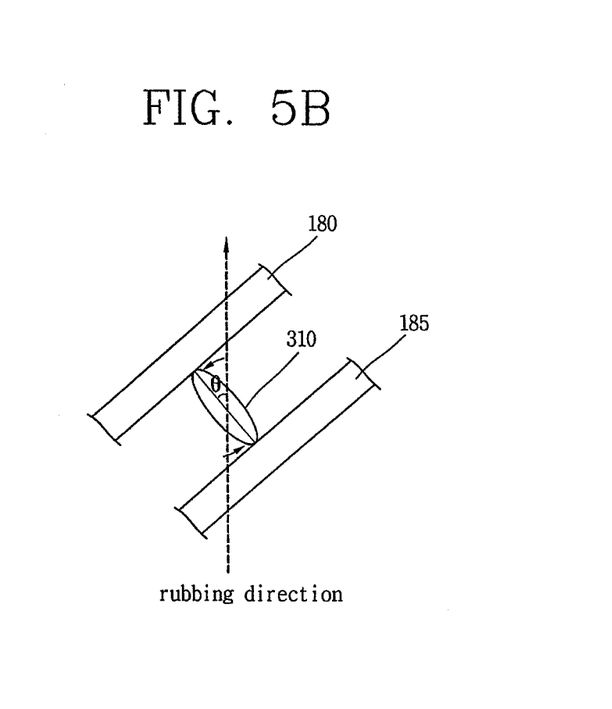

As shown in FIG. 5*a*, the liquid crystal molecule 310 may be oriented in a rubbing direction when an electric field is not formed between the pixel electrodes 180, 182 and the common electrodes 185, 187. And then, when the electric field is formed between the pixel electrodes 180, 182 and the common electrodes 185, 187, as shown in FIG. 5*b*, the liquid crystal molecule 310 is oriented in the direction of the electric field. That is, a long axis of the liquid crystal molecule 310 is rotated by θ with respect to the rubbing direction. Accordingly, an optical axis of the liquid crystal layer 300 is overall rotated by θ, accordingly the optical axis (vibration direction) of the light passing through the liquid crystal layer 300 is rotated by θ by making the optical axis of the liquid crystal layer 300 as a center. Using such a principle, it is possible to obtain desired optical characteristics by controlling a rotation degree of the long axis of the liquid crystal molecule 310. And, in case of embodiments of the present disclosure, it is capable of facilitatingly implementing a black or white screen of the reflective portion (R) and the transmissive portion (T). Here, it is supposed that the liquid crystal molecules 310 are in a homogeneous IPS (in-plane switching) mode.

Here, the operating principle of the reflective portion (R) of the pixel will be described with reference to FIGS. 6*a* and 6*b*.

Figure 6A:
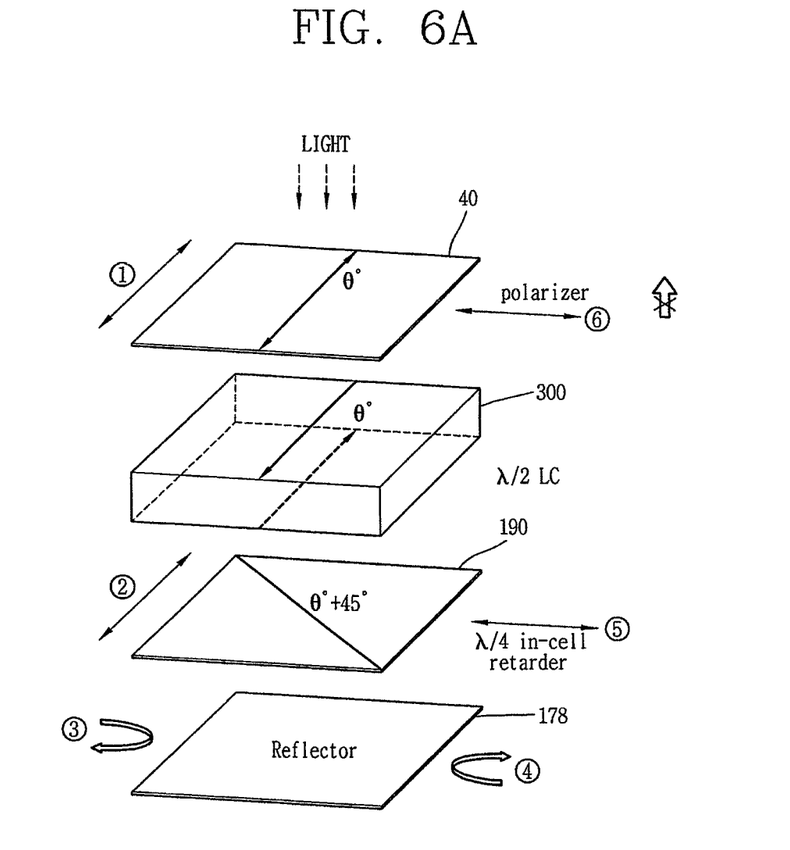
FIGS. 6a and 6b are diagrams for explaining an operating principle of a reflective portion of a pixel in accordance with one embodiment of the present disclosure.

FIG. 6*a* is a diagram for explaining an optical operation in an off state that the electric field is not formed between the first pixel electrode 180 and the first common electrode 185.

As shown in FIG. 6a, the optical axis of the liquid crystal layer 300 is parallel with the polarizing axis of the second polarizer 40. That is, by disposing the second polarizer 40 to have the polarizing axis in parallel with the rubbing direction, when power source is not applied to the first pixel electrode 180 and the first common electrode 185, the long axis of the liquid crystal molecule 310 (referring to FIG. 5a) comes to be parallel with the polarizing axis of the second polarizer 40.

And, the slow axis of the quarterwave layer 190 formed on the first substrate 100 and the polarizing axis of the second polarizer 40 have an inclination angle of 45 degrees therebetween.

Here, only the light ① having the vibration direction in parallel with the polarizing axis of the second polarizer 40 passes through the second polarizer 40 and is made to be incident on the liquid crystal layer 300. That is, a circularly polarized light is converted into a linearly polarized light ① by passing through the second polarizer 40. Here, because the optical axis of the liquid crystal layer 300 is parallel with the polarizing axis of the second polarizer 40, the light ① passed through the second polarizer 40 also passes through the liquid crystal layer 300 without any phase retardation and rotation. Because the optical axis (vibration direction) of light ② passed through the liquid crystal layer 300 is inclined by about 45 degrees with respect to the slow axis of the quarterwave layer 190, the light ② passed through the liquid crystal layer 300 is converted into a circularly polarized light ③. The converted circularly polarized light ③ is reflected from the reflector 178 and then converted into a circularly polarized light ④ having a different rotation direction. That is, by the reflector 178, a left-hand polarized light is converted into a right-hand polarized light, and the right-hand polarized light is converted into the left-hand polarized light. The circularly polarized light ④ reflected from the reflector 178 passes through the quarterwave layer 190 again, accordingly being converted into a linearly polarized light ⑤. Here, the linearly polarized light ⑤ passes the quarterwave layer 190 twice totally, accordingly being rotated by about 90 degrees with respect to the light ② that is made to be incident on the quarterwave layer 190 initially. Because the linearly polarized light ⑤ is made to be incident on the liquid crystal layer 300 and the optical axis of the linearly polarized light ⑤ is inclined by about 90 degrees with respect to the optical axis of the liquid crystal layer 300, the light passed through the liquid crystal layer 300 symmetrically proceeds by making the optical axis of the liquid crystal layer 300 as the center, accordingly being implemented as a linearly polarized light ⑥ having the same direction of optical axis. The linearly polarized light ⑤ is perpendicular with the polarizing axis of the second polarizer 40, accordingly cannot pass through the second polarizer 40, thereby implementing a black screen.

Figure 6B:
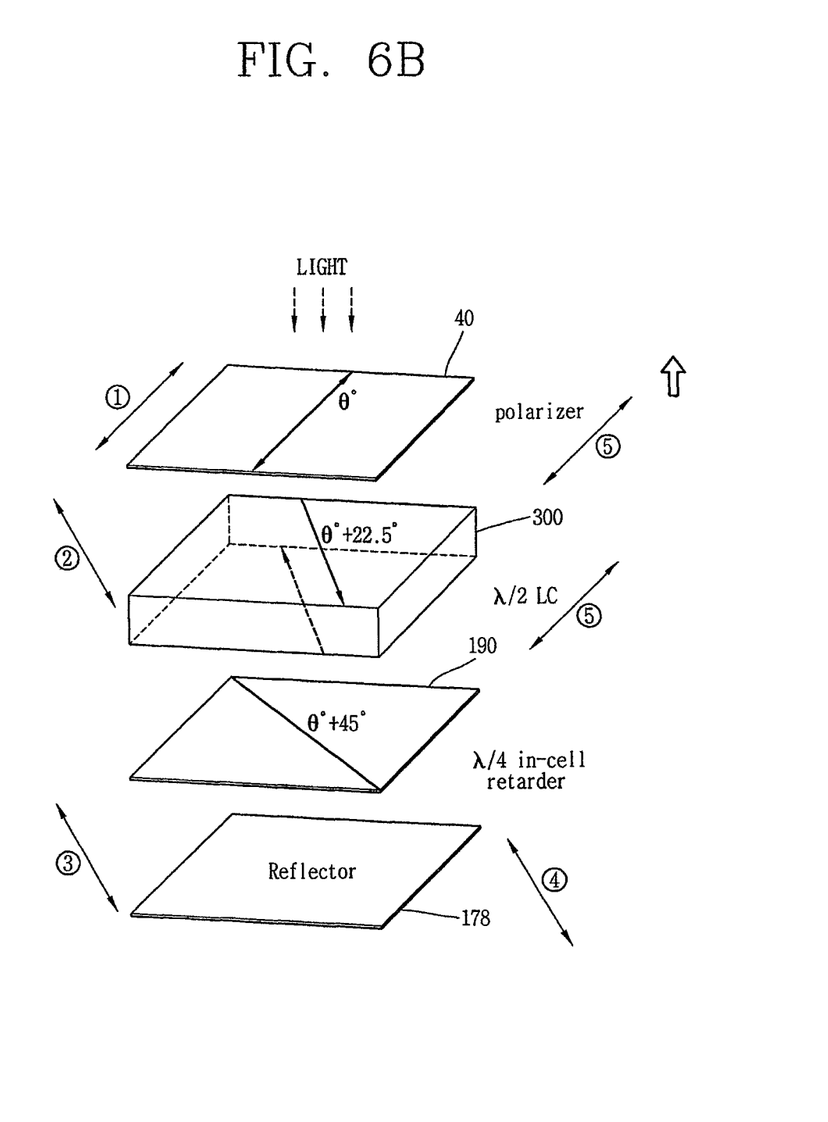

FIG. 6b is a diagram for explaining the optical operation in an on state that the electric field is formed between the first pixel electrode 180 and the first common electrode 185. As shown in FIG. 6b, the optical axis of the liquid crystal layer 300 is inclined by about 22.5 degrees with respect to the polarizing axis of the second polarizer 40. That is, because the polarizing axis of the second polarizer 40 is inclined by about 22.5 degrees with respect to the direction of the electric field formed between the first pixel electrode 180 and the first common electrode 185, when the power source is applied to the first pixel electrode 180 and the first common electrode 185, the long axis of the liquid crystal molecule 310 (referring to FIG. 5a) is aligned to be inclined by about 22.5 degrees with respect to the polarizing axis of the second polarizer 40.

And, the slow axis of the quarterwave layer 190 formed on the first substrate 100 and the polarizing axis of the second polarizer 40 have an inclination angle of about 45 degrees therebetween.

Here, only the light ① having the vibration direction in parallel with the polarizing axis of the second polarizer 40 passes through the second polarizer 40 and is made to be incident on the liquid crystal layer 300. That is, the circularly polarized light is converted into the linearly polarized light ① by passing through the second polarizer 40. The light ① passed through the second polarizer 40 is made to be incident on the liquid crystal layer 300 with being inclined by about 22.5 degrees with respect to the optical axis thereof, and the linearly polarized light ① passes through the liquid crystal layer 300, accordingly symmetrically proceeding from the optical axis of the liquid crystal layer 300 by about 22.5 degrees ②. That is, the phase of the linearly polarized light is retarded by λ/2 (180 degrees) by passing through the liquid crystal layer 300, accordingly symmetrically proceeding with respect to the optical axis of the liquid crystal layer 300. As a result, the linearly polarized light ③ is converted into the linearly polarized light ② that is rotated by about 45 degrees. Here, because of the about 45-degree rotated linearly polarized light ② has the optical axis (vibration direction) that is coincided with the slow axis of the quarterwave layer 190, accordingly passing through the quarterwave layer 190 without any phase retardation and rotation. The light ③ passed through the quarterwave layer is reflected from the reflective layer 178 and made to be incident toward the quarterwave layer 190 ④. Because the light ④ reflected from the reflector 178 is coincided with the slow axis of the quarterwave layer 190, the light ④ passes through the quarterwave layer 190 without any phase retardation and rotation, and proceeds to the liquid crystal layer 300. The light passed through the quarterwave layer 190 symmetrically proceeds by making the optical axis of the liquid crystal layer 300 as the center by passing through the liquid crystal layer 300 ⑤. The light ⑤ is coincided with the polarizing axis of the second polarizer 40, accordingly exiting outwardly, thereby implementing a white screen.

Hereafter, the operating principle of the transmissive portion (T) of the pixel will be described with reference to FIGS. 7a and 7b.

Figure 7A:
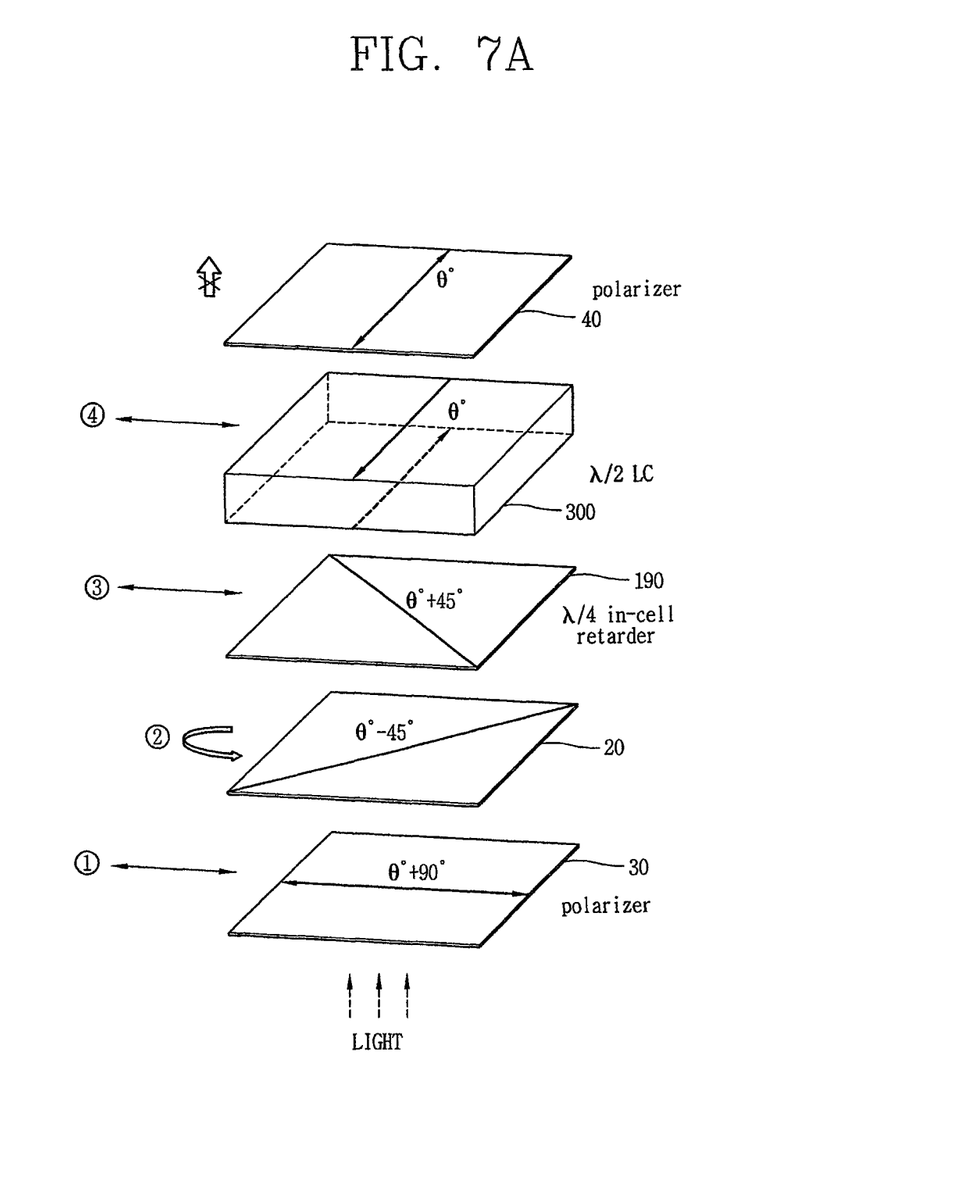
FIGS. 7a and 7b are diagrams for explaining an operating principle of a transmissive portion of a pixel in accordance with one embodiment of the present disclosure.

FIG. 7a is a diagram for explaining the optical operation in an off-state that the electric field is not formed between the second pixel electrode 185 and the second common electrode 187. As shown in FIG. 7a, the optical axis of the liquid crystal layer 300 is parallel with the polarizing axis of the second polarizer 40. That is, by disposing the second polarizer 40 to have the polarizing axis in parallel with the rubbing direction, when the power source is not applied to the first pixel electrode 180 and the first common electrode 185, the long axis of the liquid crystal molecule 310 (referring to FIG. 5a) comes to be parallel with the polarizing axis of the second polarizer 40.

And, the slow axis of the quarterwave layer 190 formed on the first substrate 100 and the polarizing axis of the second polarizer 40 have the inclination angle of about 45 degrees therebetween.

And, the polarizing axis of the first polarizer 30 is perpendicular with the polarizing axis of the second polarizer 40, and the slow axis of the quarterwave plate 20 and the slow axis of the quarterwave layer 190 are perpendicular with each other. That is, the polarizing axis of the first polarizer 30 and the slow axis of the quarterwave plate 20 have the inclination angle of about 45 degrees therebetween, and the polarizing axis of the first polarizer 30 and the slow axis of the quarterwave layer 190 have the inclination angle of about 135 degrees therebetween.

Here, only the light ① having the vibration direction in parallel with the polarizing axis of the first polarizer 30 passes through the first polarizer 30 and is made to be incident on the quarterwave plate 20. The light ① made to be incident on the quarterwave plate 20 has the optical axis (vibration direction) that is inclined by about 45 degrees with respect to the slow axis of the quarterwave plate 20. Accordingly the light passed through the quarterwave plate 20 is converted into the circularly polarized light ②. The circularly polarized light ② is made to be incident on the quarterwave layer 190, and then is converted into the linearly polarized light ③ that has the optical axis (vibration direction) having the direction same as the polarized axis of the first polarizing axis 30. In conclusion, because each slow axis of the quarterwave plate 20 and the quarterwave layer 190 has the inclination angle of about 45 degrees in an opposite direction to each other, the light ① passed through the first polarizer 30 are not changed in the phase. Because the linearly polarized light ③ is made to be incident on the liquid crystal layer 300 and the optical axis of the linearly polarized light ③ is inclined by about 90 degrees with respect to the optical axis of the liquid crystal layer 300, the light passed through the liquid crystal layer 300 symmetrically proceeds by making the optical axis of the liquid crystal angle 300 as the center, accordingly becoming the linearly polarized light ④ having the optical axis having the same direction. The linearly polarized light ④ has the inclination angle of about 90 degrees with respect to the polarizing axis of the second polarizer 40, accordingly not being capable of passing through the second polarizer 40, thereby implementing the black screen.

Figure 7B:
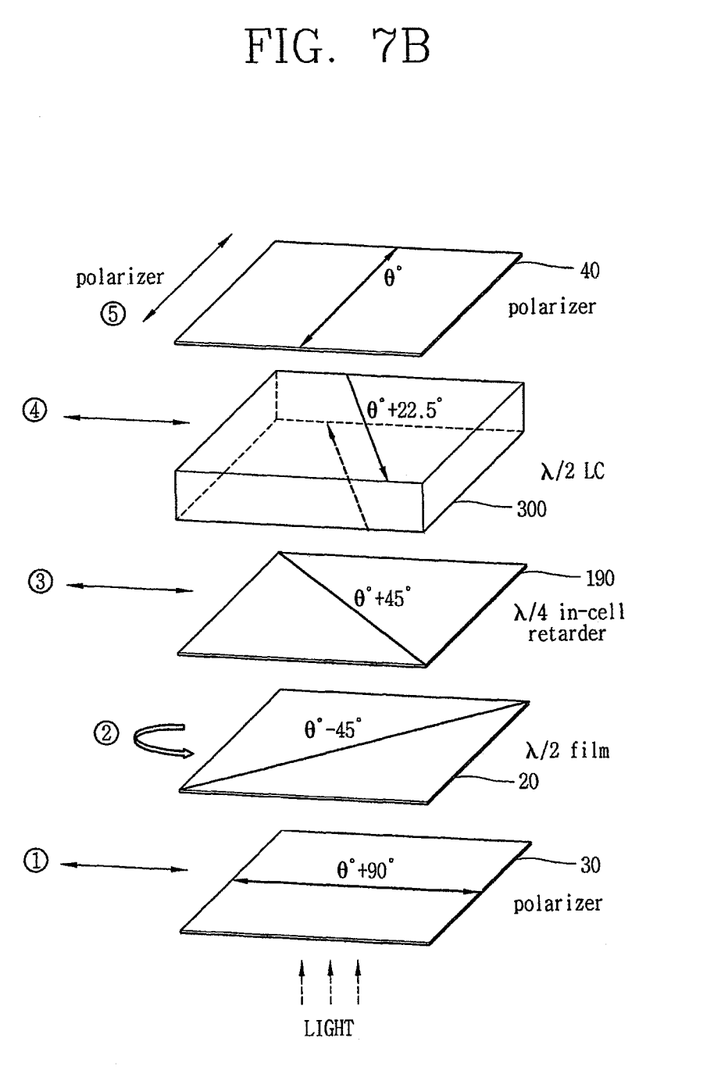

FIG. 7b is a diagram for explaining the optical operation in an on-state that the electric field is formed between the second pixel electrode 182 and the second common electrode 187. As shown in FIG. 7b, the optical axis of the liquid crystal layer 300 is inclined by about 45 degrees with respect to the polarizing axis of the second polarizer 40. That is, because the polarizing axis of the second polarizer 40 is inclined by about 45 degrees with respect to the direction of the electric field formed between the second pixel electrode 182 and the second common electrode 187, when the power source is applied to the second pixel electrode 182 and the second common electrode 187, the long axis of the liquid crystal molecule 310 (referring to FIG. 5a) is aligned to be inclined by about 45 degrees with respect to the polarizing axis of the second polarizer 40.

And, the slow axis of the quarterwave layer 190 formed on the first substrate 100 and the polarizing axis of the second polarizer 40 have the inclination angle of about 45 degrees therebetween.

And, the polarizing axis of the first polarizer 30 is perpendicular with the polarizing axis of the second polarizer 40, and the slow axis of the quarterwave plate 20 and the slow axis of the quarterwave layer 190 are perpendicular with each other. That is, the polarizing axis of the first polarizer 30 and the slow axis of the quarterwave plate 20 have the inclination angle of about 45 degrees therebetween, and the polarizing axis of the first polarizer 30 and the slow axis of the quarterwave layer 190 have the inclination angle of about 135 degrees therebetween.

Here, only the light ① having the vibration direction in parallel with the polarizing axis of the first polarizer 30 passes through the first polarizer 30 and is made to be incident on the quarterwave plate 20. The light ① made to be incident on the quarterwave plate 20 has the optical axis (vibration direction) that is inclined by about 45 degrees with respect to the slow axis of the quarterwave plate 20. Accordingly the light passed through the quarterwave plate 20 is converted into the circularly polarized light ②. The circularly polarized light ② is made to be incident on the quarterwave layer 190, and then is converted into the linearly polarized light ③ that has the optical axis (vibration direction) having the direction same as the polarizing axis of the first polarizing axis 30. In conclusion, because each slow axis of the quarterwave plate 20 and the quarterwave layer 190 has the inclination angle of about 45 degrees in an opposite direction to each other, the light ① passed through the first polarizer 30 is not changed in the phase. Because the linearly polarized light ③ is made to be incident on the liquid crystal layer 300 and the optical axis of the linearly polarized light ③ is inclined by about 45 degrees with respect to the optical axis of the liquid crystal layer 300, the light passed through the liquid crystal layer 300 symmetrically proceeds by making the optical axis of the liquid crystal angle 300 as the center, accordingly becoming the linearly polarized light □ having the optical axis that is perpendicular with the polarizing axis of the first polarizer 30. The linearly polarized light □ is coincided with the polarizing axis of the second polarizer 40. Accordingly the light □ exits outwardly, thereby implementing the white screen.

Accordingly, it is capable of implementing the same screen or different screens from each other on the front and rear surfaces.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present inventive features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An LCD device comprising:
a liquid crystal display panel that comprises a first substrate that has a plurality of pixels divided into a reflective portion and a transmissive portion therein, respectively, a second substrate that faces the first substrate, and a liquid crystal layer between the first substrate and the second substrate; and
first polarizer disposed at an exterior surface of the first substrate, and a second polarizer disposed at an exterior surface of the second substrate,
wherein light introduced into the reflective portion of the first substrate through the second substrate is reflected to the second substrate from the reflective portion, and light introduced into the transmissive portion of the first substrate transmits the first substrate so that images being displayed in both sides of the liquid crystal display panel,
wherein a long axis of each liquid crystal molecules of the liquid crystal layer in the reflective portion is inclined by about 22.5 degrees with respect to a polarizing axis of the second polarizer when an electric field is generated between the first pixel electrode and the first common electrode, while aligned in parallel with the polarizing axis of the second polarizer when the electric field is not generated.

2. The LCD device of claim 1, further comprising a quarterwave plate between the first substrate and the first polarizer.

3. The LCD device of claim 2, wherein the first substrate comprises:
- a first pixel electrode and a first common electrode disposed alternately parallel with each other at the reflective portion; and
- a second pixel electrode and a second common electrode disposed alternately parallel with each other at the transmissive portion,
- wherein the first pixel electrode and the first common electrode are aligned in an angle either identical to or different from the second pixel electrode and the second common electrode.

4. The LCD device of claim 3, wherein the first substrate further comprises:
- a plurality of first gate lines and a plurality of second gate lines on the first substrate in parallel with each other;
- a plurality of data lines that crosses the first gate lines and the second gate lines to define a plurality of pixels; and
- a quarterwave layer at the pixel.

5. The LCD device of claim 4, wherein the first substrate further comprises:
- a first thin film transistor at respective intersection of the first gate lines and the data lines to operate the reflective portion; and
- a second thin film transistor at respective intersection between the second gate lines and the data lines to operate the transmissive portion.

6. The LCD device of claim 5, wherein the first substrate further comprises:
- a reflector disposed at the reflective portion, the first pixel electrode and the first common electrode disposed on the reflector.

7. The LCD device of claim 1, wherein each long axis of liquid crystal molecules of the liquid crystal layer disposed at the transmissive portion is inclined by about 45 degrees with respect to the polarizing axis of the second polarizer when the electric field is generated between the second pixel electrode and the second common electrode, while aligned in parallel with the polarizing axis of the second polarizer when the electric field is not generated.

8. The LCD device of claim 3, wherein the first pixel electrode and the second pixel electrode are separated from each other, and the first common electrode and the second common electrode are separated from each other.

9. The LCD device of claim 5, further comprising a diffusion layer that covers the first thin film transistor and the second thin film transistor, wherein a concave-convex portion is disposed at an area of the diffusion layer corresponding to the reflective portion.

10. The LCD device of claim 9, wherein a reflective layer is disposed on the concave-convex portion, and further comprises a protective film that covers the reflective layer.

11. The LCD device of claim 10, wherein the first pixel electrode, the second pixel electrode, the first common electrode and the second common electrode are disposed on the reflective film, and
wherein drain contact openings that respectively expose drain electrodes of the first thin film transistor and the second thin film transistor are disposed at the diffusion layer and the reflective film.

12. The LCD device of claim 11, wherein the first pixel electrode is connected to the drain electrode of the first thin film transistor through the drain contact opening, and the second pixel electrode is connected to the drain electrode of the second thin film transistor through the drain contact opening.

13. The LCD device of claim 10, wherein the quarterwave layer is disposed on a protective film so as to cover the first pixel electrode, the second pixel electrode, the first common electrode and the second common electrode.

14. The LCD device of claim 4, wherein the quarterwave layer comprises a photosensitive polymer reactive mesogen.

15. The LCD device of claim 4, wherein the quarterwave layer has a slow axis inclined by about 45 degrees with respect to the polarizing axis of the second polarizer.

16. The LCD device of claim 4, wherein the quarterwave layer has the slow axis inclined by about 90 degrees with respect to the slow axis of the quarterwave plate.

17. The LCD device of claim 1, wherein the liquid crystal layer has a retardation value of about $\lambda/2$.

18. The LCD device of claim 4, wherein the first substrate further comprises a common voltage line between the reflective portion and the transmissive portion and extended therefrom in parallel with the first gate line, and
wherein the common voltage line is connected to the first common electrode and the second common electrode.

19. An LCD device comprising:
- a liquid crystal display panel that comprises a first substrate that has a plurality of pixels divided into a reflective portion and a transmissive portion therein, respectively, a second substrate that faces the first substrate, and a liquid crystal layer between the first substrate and the second substrate;
- a first polarizer disposed at an exterior surface of the first substrate; and
- a second polarizer disposed at an exterior surface of the second substrate,
- wherein a long axis of each liquid crystal molecules of the liquid crystal layer in the reflective portion is inclined by about 22.5 degrees with respect to a polarizing axis of the second polarizer when an electric field is generated between the first pixel electrode and the first common electrode, while aligned in parallel with the polarizing axis of the second polarizer when the electric field is not generated.

20. The LCD device of claim 19, wherein each long axis of liquid crystal molecules of the liquid crystal layer disposed at the transmissive portion is inclined by about 45 degrees with respect to the polarizing axis of the second polarizer when the electric field is generated between the second pixel electrode and the second common electrode, while aligned in parallel with the polarizing axis of the second polarizer when the electric field is not generated.

21. The LCD device of claim 19, further comprising a quarterwave plate between the first substrate and the first polarizer.

22. The LCD device of claim 21, wherein the first substrate further comprises a quarterwave layer at the pixel.

23. The LCD device of claim 22, wherein the quarterwave layer has a slow axis inclined by about 45 degrees with respect to the polarizing axis of the second polarizer.

24. The LCD device of claim 22, wherein the quarterwave layer has the slow axis inclined by about 90 degrees with respect to the slow axis of the quarterwave plate.

25. The LCD device of claim 19, wherein the liquid crystal layer has a retardation value of about $\lambda/2$.

* * * * *